Aug. 1, 1950  B. L. BENZLER  2,517,279
CONTROL DEVICE FOR ROTARY RECIPROCATING ENGINES
Filed June 4, 1945
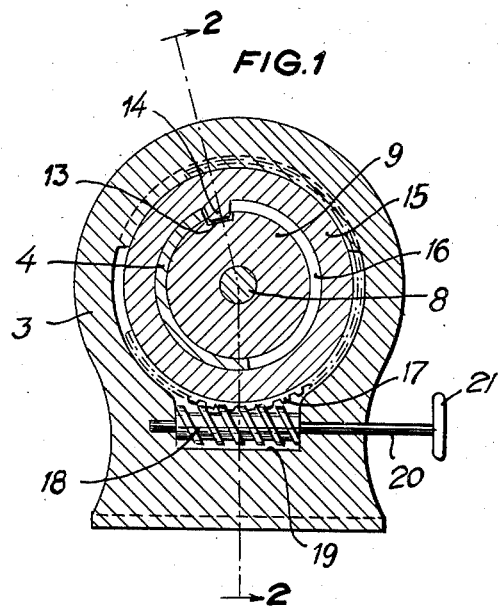
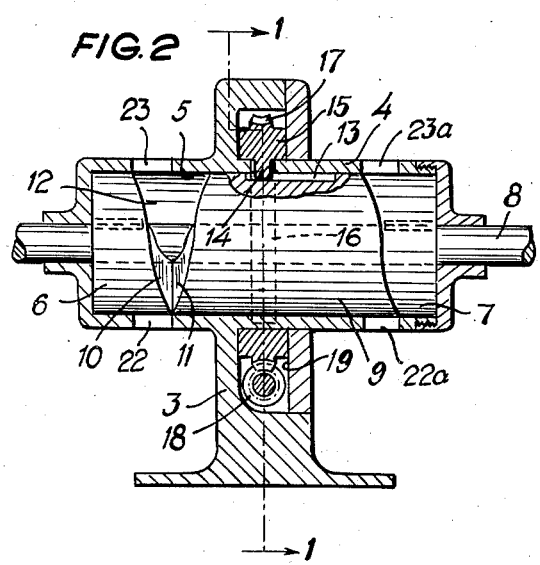
Bengt Lennart Benzler
INVENTOR.
BY
Cushman, Darby & Cushman
ATTYS.

Patented Aug. 1, 1950

2,517,279

UNITED STATES PATENT OFFICE 2,517,279

CONTROL DEVICE FOR ROTARY RECIPROCATING ENGINES

Bengt Lennart Benzler, Stockholm, Sweden

Application June 4, 1945, Serial No. 597,506
In Sweden April 6, 1944

Section 1, Public Law 690, August 8, 1946
Patent expires April 6, 1964

2 Claims. (Cl. 103—175)

This invention relates to reciprocating engines of the type including a housing having an inner cylindrical face, rotatable operating means extending axially into the housing, spaced rotors secured to the operating means and fitting said cylindrical face and having bevelled end faces, and a reciprocating piston between the rotors and abutting the adjacent inner ends thereof. In engines of this type, increasing and decreasing spaces are formed, during the rotation of the rotors, between the piston and the abutting ends of the rotors.

The object of the invention is to provide improved means for controlling the quantity of fluid passing through the engine for each revolution of the rotors.

I attain this object by mechanism illustrated in the accompanying drawing, in which:

Fig. 1 is a cross-sectional view of an engine provided with control means in accordance with the invention, the section being taken along the line 1—1, Fig. 2; and Fig. 2 is a partial longitudinal section of Fig. 1 on the line 2—2, Fig. 1.

Referring to the drawing, there is shown a block 3 integral with a housing 4 having an inner cylindrical surface 5. Within the housing or cylinder 4 are spaced rotors 6 and 7 keyed or otherwise secured to an axial shaft 8 which is rotatably mounted in the cylinder. Between the rotors 6 and 7 is a reciprocating single or one-piece piston 9 slidably mounted on the shaft 8 and abutting the adjacent inner ends of the rotors. The ends of the piston and the abutting ends of the rotors have contacting bevelled surfaces, such as shown at 10 and 11, for moving the piston axially upon rotation of the rotors and for forming increasing and decreasing spaces between the piston and the rotors. In the position shown in Fig. 2, the volume of the space 12 between the piston and the rotor 6 is a maximum, while the volume of the space between the piston and the rotor 7 is substantially nought. A longitudinal or axial groove 13 is formed in the outer surface of the piston 9. An inwardly extending radial pin 14 fits into the groove 13. The pin 14 is integral with a ring 15 rotatably mounted on the cylinder 4 and prevented from axial movement. The cylinder is provided with a circumferentially disposed cut-out portion or slot 16 that extends about 180°. The ring 15 has on its outer periphery a segmental tooth portion 17 that meshes with a worm 18 mounted within a transverse recess 19 in the block 3. The worm 18 has an outwardly extending operating shaft 20 which carries a hand wheel 21 operable from outside the block and housing.

As is well known, in engines of this type the spaces between the piston and the rotors are alternately increased and decreased between a minimum and maximum value, this being a result of the reciprocating movement of the piston upon rotation of the shaft and rotors, the piston being prevented from turning movement due to the engagement between the pin 14 and the groove 13. Irrespective of whether the engine is operated as a motor or pump, liquid passes through the variable spaces of the engine, the housing being for that purpose provided with inlet openings and outlet openings or ports 22, 22a and 23, 23a, respectively, which are controlled by the edges of the rotors 6 and 7.

If it is desired to vary the quantity of liquid passing through the engine during one revolution of the rotors, this can be effected by varying the angular position of the piston 9 in relation to the housing and the inlet and outlet openings thereof so as to vary the time when the openings are covered and uncovered by the rotors. To this end, the ring 15 is turned by means of the handle 21 and the worm 18, the pin 14 thereby sliding in the recess 16. Since the pin engages the axial groove 13, the piston 9 will be turned to a corresponding degree.

What I claim is:

1. A reciprocating engine of the class described including a housing, a rotatable operating shaft extending axially into the housing, spaced rotors keyed to said shaft, a reciprocating one-piece piston between said rotors and abutting the adjacent inner ends thereof, the ends of the piston and the abutting ends of the rotors having contacting beveled surfaces for moving the piston axially upon rotation of the rotors and for forming increasing and decreasing spaces between the piston and the rotors, said piston having a longitudinal groove in the outer surface thereof, a ring surrounding said housing and having an inwardly extending radial pin projecting through said housing and into said groove, said housing having a circumferential slot for said pin and inlet and outlet means controlled by said rotors, and means operatively connected to said ring for rotating the ring and the piston so as to adjust the latter relative to the housing.

2. A reciprocating engine of the class described including a housing, a rotatable operating shaft extending axially into the housing, spaced rotors keyed to said shaft, a reciprocating one-piece piston between said rotors and abutting the adjacent inner ends thereof, the ends of the piston and the abutting ends of the rotor having contacting beveled surfaces for moving the piston axially upon rotation of the rotors, said housing having inlet and outlet means controlled by said rotors, said piston having a longitudinal extending groove in the outer surface thereof, a ring surrounding said housing and having an inwardly extending radial projection extending through said housing and fitting in said groove, the housing adjacent said ring having a circumferentially disposed slot extending substantially 180° and arranged to receive said pin, the outer surface of said ring having a toothed portion, and a worm transversely mounted in the housing and meshing with said tooth portion, said worm having an operating handle extending outwardly from the housing for turning the piston relative to the housing.

BENGT LENNART BENZLER.

REFERENCES CITED

The following references are of record in the file of this patent:

UNITED STATES PATENTS

| Number | Name | Date |
|--------|------|------|
| 659,675 | Jaeger | Oct. 16, 1900 |
| 1,343,612 | Born | June 15, 1920 |
| 1,404,625 | Marquet | Jan. 24, 1922 |
| 2,316,107 | Ruben | Apr. 6, 1943 |

FOREIGN PATENTS

| Number | Country | Date |
|--------|---------|------|
| 127,692 | Great Britain | June 2, 1919 |
| 357,502 | Great Britain | Mar. 21, 1930 |
| 487,985 | Great Britain | June 29, 1938 |